L. X. TRUXLER.
HAND TRUCK.
APPLICATION FILED MAY 19, 1909.
938,917.
Patented Nov. 2, 1909.
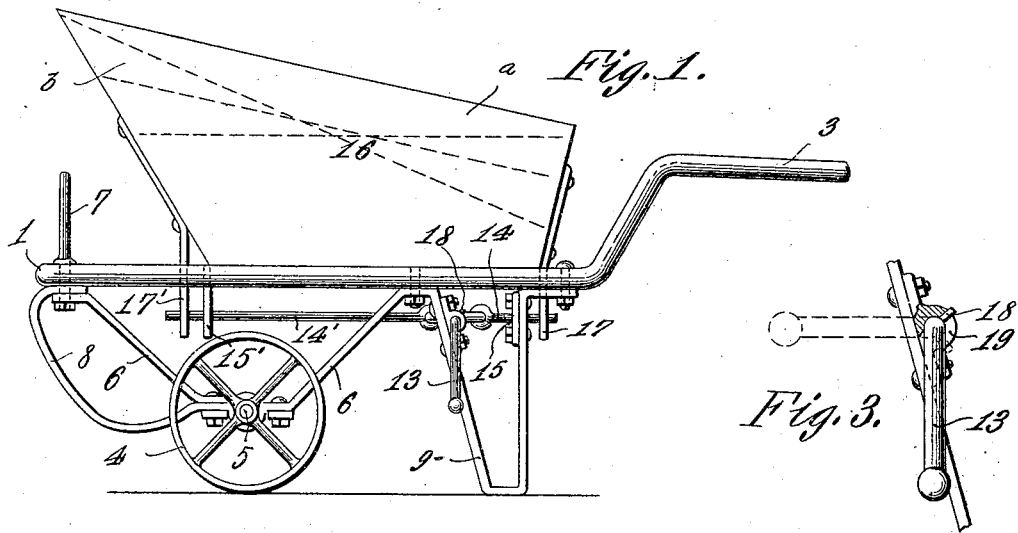
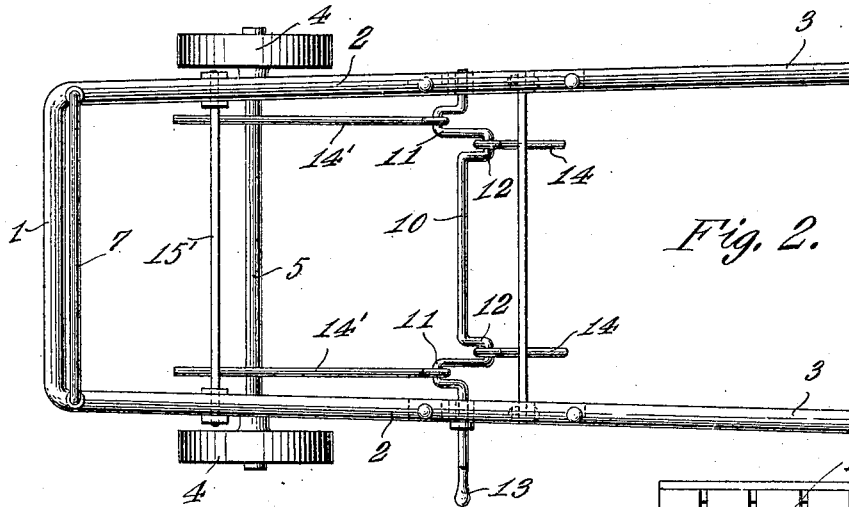
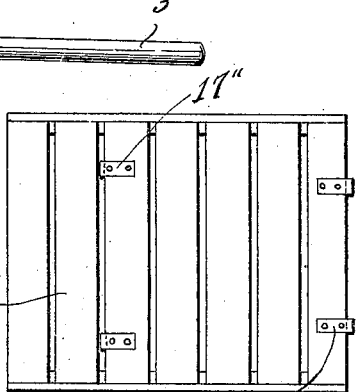
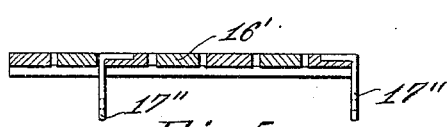
Witnesses
E. Larson
S. E. Dodge
Inventor
L. X. Truxler,
By Beeler & Cobb
Attorney

UNITED STATES PATENT OFFICE.

LOUIS X. TRUXLER, OF VERNON, BRITISH COLUMBIA, CANADA.

HAND-TRUCK.

938,917.   Specification of Letters Patent.   Patented Nov. 2, 1909.

Application filed May 19, 1909.   Serial No. 497,035.

*To all whom it may concern:*

Be it known that I, Louis X. Truxler, a citizen of Canada, residing at Vernon, in the county of Yale and Province of British Columbia, Canada, have invented certain new and useful Improvements in Hand-Trucks, of which the following is a specification.

This invention relates to improvements in hand trucks and comprises a novel form of truck of this type particularly advantageous for use in connection with the construction of buildings, or the like.

Specifically speaking, the invention embodies a truck adapted to be tilted as it is propelled forwardly, and after receiving a load, the construction of the pan or box of the truck being peculiar in that when the truck is elevated for moving the same the load becomes balanced on the wheels relieving the trucker of the weight thereof, the desirability of this feature being very evident.

In a further adaptation of the invention it is contemplated to provide a truck and interchangeable load supporting means adapted to be mounted on the frame of the truck. Special mechanism is employed for securing and releasing the load supporting means, which consists of an interchangeable pan or box and flat platform, with respect to the frame of the truck.

The invention involves certain other advantageous features of construction and operation, and for a full understanding of the same, reference is to be had to the following detail description and to the accompanying drawings, in which—

Figure 1 is a side elevation of a truck embodying the invention; Fig. 2 is a top plan view of the truck, the pan or box removed; Fig. 3 is a fragmentary view, partly in section bringing out more clearly the mounting of the crank shaft on the legs of the truck and by which shaft the load supporting body is released; Fig. 4 is a top plan view of the auxiliary load supporting device or platform; Fig. 5 is a vertical sectional view of the platform shown in Fig. 4.

Throughout the following detail description and on the several figures of the drawings similar parts are referred to by like reference characters.

Referring to the drawings the frame of the truck is designated A and comprises a front end portion 1 and the sides 2, the latter being bent upwardly and outwardly at their rear ends to provide the handles 3 which are grasped by the trucker in moving the truck from one place to another. The frame A is mounted on wheels 4 supported by an axle 5, the latter being mounted in bearings provided by downwardly extending members 6 at the front portion of the truck. At the front end of the frame A is provided a foot piece 7 and arranged beneath the sides 2 of the frame A, at the front end of the frame, are the curved rests 8, said rests being attached at their upper ends to the front end of the frame and at their lower ends to the lower portions of the front members 6. Suitable legs 9 are connected with the rear end portions of the sides 2 of the frame A and mounted on the inner sides of said legs 9 is a crank shaft 10 having sets of opposite cranks 11 and 12, the shaft 10 is provided with a crank handle 13 at one end thereof.

Connected with the cranks 12 are bolts 14 which operate through a cross piece 15 secured to the sides 2 of the frame A. In like manner the cranks 11 are connected with bolts 14' extending forwardly from the crank shaft and guided in their movement by being passed through a cross piece 15' similar to the cross piece 15 above described. Supported upon the frame A is the load support which in Fig. 1 consists of a pan or box 16. Said pan is provided at its rear end with downwardly projecting plates 17 having openings through which the bolts 14 are adapted to pass in order to connect this end of the load support with the frame A.

Extending downwardly from the front portion of the pan 16 are the plates 17' having openings through which the bolts 14' may pass. When the bolts 14 and 14' are in engagement with the plates 17 and 17' it will be apparent that the load support 16 is effectively locked to the frame 1. However, should it be desired to remove the pan 16, which is particularly adapted for transporting mortar or material in plastic state, and substitute therefor the support or platform 16' shown in Figs. 4 and 5 it is only necessary to give the crank handle 13 a quarter revolution whereby the bolts 14 and 14' will be operated by the cranks 11 and 12, and the plates 17 and 17' released from the bolts. The pan or box 16 may then be readily removed from the frame A and the platform placed upon the frame so that its engaging plates 17'', corresponding with the plates 17 and 17', of the pan 16, are adapted to be engaged by the locking bolts on the frame. It will be seen that the platform 16' may be rigidly locked to the frame A by means of the locking bolts and on operation of the crank shaft 10 by the handle 13. In order to limit the movement of the crank handle 13 the shaft 10 is provided at that one end portion with a pin 18 working in a slot 19 in the bearing on one of the legs 19. The slot 19 is only sufficiently large enough to permit a quarter turn of the handle 13 to move the same into the dotted line position illustrated in Fig. 3.

As shown clearly in Fig. 1 the pan 16 is of peculiar formation. It consists of a body portion *a* formed with the forward extension *b*, the extension *b* projecting at an angle to the body *a* and the angle being located substantially above the wheels 4 upon which the load support is tilted by elevating the frame A by the handles 3. It will be apparent that when the pan 16 is loaded a large part of the load is received in the extension *b* so that when the truck is elevated at its rear end to facilitate propulsion by the trucker, the weight of the load in the extension *b* substantially balances that in the body *a* of the pan 16, relieving the trucker of such weight which is received wholly upon the wheels 4. The upper edge of the pan 16 inclines upwardly to the upper end of the extension *b*, this being desirable especially because when the load in the pan 16 is plastic material, the elevation of the rear end of the truck will cause the plastic substance to move into and practically fill the extension *b*, whereby the balancing of the load on the wheels is accomplished. In this connection see dotted lines in Fig. 1 illustrating the manner in which the extension receives the plastic material when the truck is horizontal, tilted for forward propulsion, or when supported partly by the rests 8 with the load ready to be dumped and under easy control of the trucker.

The load support or platform 16' shown in Figs. 4 and 5 is especially designed for conveying bricks or solid bodies from one place to another, under which conditions the foot piece 7 is necessarily employed to prevent the load from falling off the truck.

Having thus described the invention, what is claimed as new is:

1. In a hand truck, the combination of a wheeled frame, a load supporting body mounted thereon, a plurality of locking bolts for connecting the supporting frame, and means for connecting and releasing the bolts with respect to the support.

2. In a hand truck, the combination of a wheeled frame, a load support mounted thereon, plates projecting from said load support, a plurality of locking bolts mounted on the frame, and means for engaging and disengaging said bolts with respect to the plates of the support.

3. In a hand truck, the combination of a wheeled frame, a load support mounted thereon, plates projecting downwardly from the load support, locking bolts mounted on the frame and arranged to engage the plates to secure the load support to said frame, and a crank shaft operatively connected with said bolts to release the same from the plates aforesaid.

4. In a hand truck, the combination of a wheeled frame, a load support mounted thereon, plates projecting downwardly from the load support, locking bolts mounted on the frame and arranged to engage the plates to secure the load support to said frame, a crank shaft operatively connected with said bolts to release the same from the plates aforesaid, and means for limiting the movement of the crank shaft to thereby limit the movement of the locking bolts.

5. In a hand truck, the combination of a wheeled frame, a load support mounted thereon, plates projecting downwardly from opposite ends of the support, a crank shaft mounted on the frame, opposite sets of cranks in the length of said shaft, a pair of bolts connected with each of said cranks and extending in opposite directions to engage the plates at opposite ends of the load supporting body, and a handle for turning the crank shaft to release the pairs of locking bolts simultaneously from the plates of the load support.

In testimony whereof I affix my signature in presence of two witnesses.

LOUIS X. TRUXLER.

Witnesses:
A. BRIDGMAN,
CHAS. E. CISTERTEN.